(12) United States Patent
Dean et al.

(10) Patent No.: US 9,403,155 B2
(45) Date of Patent: Aug. 2, 2016

(54) CATALYST ADDITIVE FOR REDUCTION OF SULFUR IN CATALYTICALLY CRACKED GASOLINE

(71) Applicants: Saudi Arabian Oil Company, Dhahran (SA); KING FAHD UNIVERSITY OF PETROLEUM and MINERALS, Dhahran (SA)

(72) Inventors: Christopher F. Dean, Houston, TX (US); Musaed Salem Musaed Al-Ghrami Al-Ghamdi, Dhahran (SA); Khurshid K. Alam, Alkhobar (SA); Mohammed Abdul Bari Siddiqui, Dhahran (SA); Shakeel Ahmed, Dhahran (SA)

(73) Assignees: SAUDI ARABIAN OIL COMPANY, Dhahran (SA); KING FAHD UNIVERSITY OF PETROLEUM AND MINERAL, Dhahran (SA)

( * ) Notice: Subject to any disclaimer, the term of this patent is extended or adjusted under 35 U.S.C. 154(b) by 0 days.

(21) Appl. No.: 13/761,662

(22) Filed: Feb. 7, 2013

(65) Prior Publication Data

US 2013/0210613 A1 Aug. 15, 2013

Related U.S. Application Data

(62) Division of application No. 11/477,275, filed on Jun. 28, 2006, now Pat. No. 8,409,428.

(51) Int. Cl.
*B01J 29/08* (2006.01)
*B01J 20/02* (2006.01)
*B01J 20/12* (2006.01)
*B01J 20/32* (2006.01)
*B01J 23/06* (2006.01)
*B01J 35/00* (2006.01)
*B01J 37/02* (2006.01)
*C10G 11/05* (2006.01)
*C10G 11/18* (2006.01)
*B01J 21/06* (2006.01)
*B01J 21/16* (2006.01)
*B01J 37/30* (2006.01)

(52) U.S. Cl.
CPC ............ *B01J 29/088* (2013.01); *B01J 20/0211* (2013.01); *B01J 20/0244* (2013.01); *B01J 20/12* (2013.01); *B01J 20/3204* (2013.01); *B01J 20/3236* (2013.01); *B01J 23/06* (2013.01); *B01J 29/084* (2013.01); *B01J 35/0006* (2013.01); *B01J 37/0205* (2013.01); *B01J 37/0207* (2013.01); *C10G 11/05* (2013.01); *C10G 11/18* (2013.01); *B01J 21/066* (2013.01); *B01J 21/16* (2013.01); *B01J 35/0073* (2013.01); *B01J 37/30* (2013.01); *C10G 2300/104* (2013.01); *C10G 2300/202* (2013.01); *C10G 2300/80* (2013.01)

(58) Field of Classification Search
None
See application file for complete search history.

(56) References Cited

U.S. PATENT DOCUMENTS

| | | | |
|---|---|---|---|
| 4,085,030 A | 4/1978 | Duraiswamy et al. | |
| 4,176,090 A | 11/1979 | Lussier et al. | |
| 4,271,043 A | 6/1981 | Lussier et al. | |
| 4,280,893 A | 7/1981 | Leas | |
| 4,305,809 A | 12/1981 | Chen et al. | |
| 4,499,195 A | 2/1985 | Wheelock | |
| 4,661,464 A | 4/1987 | Atkins | |
| 4,772,378 A | 9/1988 | Ikeda et al. | |
| 4,963,520 A * | 10/1990 | Yoo et al. | 502/64 |
| 5,376,608 A * | 12/1994 | Wormsbecher et al. | 502/61 |
| 5,525,210 A | 6/1996 | Kim et al. | |
| 5,801,115 A | 9/1998 | Albers et al. | |
| 6,036,847 A * | 3/2000 | Ziebarth et al. | 208/113 |
| 6,090,274 A | 7/2000 | Drake et al. | |
| 6,156,689 A | 12/2000 | Kimble et al. | |
| 6,482,315 B1 * | 11/2002 | Roberie et al. | 208/249 |
| 6,497,811 B1 | 12/2002 | Myrstad et al. | |
| 6,635,168 B2 | 10/2003 | Zhao et al. | |
| 6,635,169 B1 | 10/2003 | Bhore et al. | |
| 6,670,058 B2 | 12/2003 | Muradov | |
| 6,821,412 B1 * | 11/2004 | Fujukawa et al. | 208/210 |
| 2002/0051878 A1 | 5/2002 | Lussier et al. | |

(Continued)

FOREIGN PATENT DOCUMENTS

| | | | | |
|---|---|---|---|---|
| EP | 798362 A2 | 10/1997 | | |
| WO | 9709113 A1 | 3/1997 | | |
| WO | WO 97/48480 | * 12/1997 | ............ | B01D 53/50 |
| WO | 9920712 A1 | 4/1999 | | |
| WO | WO 01/15805 | * 3/2001 | | |
| WO | 0142320 A1 | 6/2001 | | |

OTHER PUBLICATIONS

Manual of Methods and Procedures for Catalyst Characterization Pure and Applied Chemistry, vol. 67, Nos. 8/9, pp. 1257-1306, 1995 J. Haber, J.H.Block and B. Delmon.*

(Continued)

*Primary Examiner* — Melvin C Mayes
*Assistant Examiner* — Douglas Call
(74) *Attorney, Agent, or Firm* — Abelman, Frayne & Schwab

(57) ABSTRACT

The present invention concerns a novel additive composition for reducing sulfur content of a catalytically cracked gasoline fraction. This additive composition comprises a support consisting of porous clay into which a first metal from group IVB is incorporated and a second metal from group IIB is impregnated. Preferably, the first incorporated metal is zirconium and the second impregnated metal is zinc. The sulfur reduction additive is used in the form of a separate particle in combination with a conventional cracking catalyst in a fluidized catalytic cracking process to convert hydrocarbon feed stocks into gasoline having comparatively lower sulfur content and other liquid products.

4 Claims, 5 Drawing Sheets

(56) References Cited

U.S. PATENT DOCUMENTS

| | | |
|---|---|---|
| 2004/0029717 A1 | 2/2004 | O'Connor et al. |
| 2005/0121363 A1 | 6/2005 | Vierheilig et al. |
| 2005/0209093 A1* | 9/2005 | Chester et al. .................. 502/65 |
| 2006/0102522 A1* | 5/2006 | Turaga et al. ............. 208/208 R |

OTHER PUBLICATIONS

Andersson et al., "Cracking catalyst additives for sulfur removal from FCC gasoline," Elsevier, Catalysis Today 53, 1999, pp. 565-573.

Hernandez-Beltran et al., "Effect of Highly Reactive Sulfur Species on Sulfur Reduction in Cracking Gasoline," Elsevier, Applied Catalysis B: Environmental 42, 2003, pp. 145-154.

Hernandez-Beltran et al., "Sulfur reduction in cracked naphtha by a commercial additive," Elsevier, Applied Catalysis B: Environmental 34, 2001, pp. 137-148.

Lesemann et al., "Noncapital intensive technologies reduce FCC sulfur content," Hydrocarbon Processing, Feb. 2003, pp. 69-76.

Schoonheydt et al., "Pillared Clays and Pillared Layered Solids," Pure And Applied Chemistry, vol. 71, No. 12, 1999, pp. 2367-2371.

Siddiqui et al., "Sulfur Reduction in FCC Gasoline Using Catalyst Additives," Applied Catalysis, 303, 2006, pp. 116-120.

European Patent Application 07796394.0 Response to Office Action, Jul. 27, 2010, pp. 1-10.

European Patent Application 07796394.0 Supplemental Search Report, Sep. 28, 2009, pp. 1-9.

PCT/US07/14655 International Search Report, Jan. 23, 2008, pp. 1-2.

* cited by examiner

CATALYST ADDITIVE FOR REDUCTION OF SULFUR IN CATALYTICALLY CRACKED GASOLINE

RELATED APPLICATIONS

This application is a divisional application of U.S. Ser. No. 11/477,275 filed Jun. 28, 2006, now U.S. Pat. No. 8,409,428 the disclosure of which application is incorporated herein by reference.

FIELD OF THE INVENTION

This invention relates to the reduction of sulfur in gasoline produced in a fluid catalytic cracking process and, more particularly, to a method and composition for reducing sulfur by the use of a catalyst-containing additive.

BACKGROUND OF THE INVENTION

Fluid catalytic cracking (FCC) is the largest refining process for gasoline production with global capacity of more than 14.2 million b/d. The process converts heavy feedstocks such as vacuum distillates, residues, and deasphalted oil into lighter products, which are rich in olefins and aromatics. FCC catalysts are typically solid acids of fine-particles especially zeolites (synthetic Y-faujasite), aluminum silicate, treated clay (kaolin), bauxite, and silica-alumina. The zeolite content in commercial FCC catalysts is generally in the range of 5-40 wt %, or greater, while the balance is silica-alumina amorphous matrix. Additives to the FCC process amount usually to no more than 10% of the catalyst, and they are basically used to enhance octane, as metal passivators, SOx reducing agents, CO oxidation and, recently, for gasoline sulfur reduction.

Stringent environmental regulations that target the sulfur content of gasoline and tailpipe emissions are being enforced worldwide. Sulfur in gasoline increases $SO_x$ emissions in combustion gases, reduces the activity of vehicle catalytic converters, and promotes corrosion of engine parts. The upper limit of sulfur in gasoline in the US and European Union will soon be set at 30 ppm as a refinery average. Moreover, the introduction of "sulfur free fuels" (<10 ppm) has been proposed in many countries for the year 2007. Also, many Asian countries have recently decreased the permitted sulfur specifications in transportation fuels.

A number of options are available for the reduction of sulfur in gasoline. The main options are hydrotreating the FCC feed, hydrotreating product naphtha, lowering the end boiling point of FCC gasoline, and the use of sulfur reducing additive in FCC catalysts. The first two options are highly capital intensive. A disadvantage regarding the third option is that the lowering of end boiling point will also reduce the octane number, in addition to reducing the yield of gasoline. From the economic point of view, the last option is the most desirable since this will selectively desulfurize the gasoline fraction without the need for additional treatment. It has been reported that sulfur reduction by FCC additives or catalysts offers economic advantages over the standard solution-selective gasoline hydrotreating or EDS methods. (Lesemann and Schult [2003]).

Various catalytic materials for effecting a sulfur reduction have been developed for use during the FCC process. The sulfur reduction component may be a separate additive to the FCC catalyst or part of a FCC sulfur reduction catalyst. However, the levels of sulfur in gasoline are still not low enough and, accordingly, are unacceptable.

A catalyst additive for the reduction of sulfur in FCC gasoline cracking products was proposed by Wormbecher in U.S. Pat. No. 5,376,608, which is incorporated herein by reference, and Kim in U.S. Pat. No. 5,525,210, which is incorporated herein by reference, using a cracking catalyst additive of an alumina-supported Lewis acid for the production of reduced-sulfur gasoline. It was also disclosed that the Lewis acid may comprise components and compounds including Zn, Cu, Ni, Ag, Cd and Ga deposited on aluminum oxide. However, this system has not achieved significant commercial success.

Another composition disclosed in U.S. Pat. No. 6,036,847 by Ziebarth, which is incorporated herein by reference, et al. used 10 wt % of a composition containing Zn supported on alumina and titania as an additive in the cracking of 2.7 wt % sulfur vacuum gas oil (VGO) feed. The results indicated that the combination of alumina-supported Lewis acid component and titania-containing component resulted in greater sulfur reduction than the use of either component alone.

Another additive, disclosed by Myrstad et al. in U.S. Pat. No. 6,497,811, which is incorporated herein by reference, comprised a composition of a hydrotalcite material, which had been impregnated with a Lewis acid, and optionally an FCC-catalyst. The Lewis acid was selected from the group comprising elements and compounds of the transition metals, and preferably Zn, Cu, Ni, Co, Fe and Mn, most preferably Zn.

Another additive disclosed by Roberie et al. in U.S. Pat. No. 6,482,315, which is incorporated herein by reference, used a composition comprising vanadium supported on a refractory inorganic oxide selected from the group consisting of alumina, silica, clay and mixtures thereof. When using 2 wt. % vanadium-containing additive, a 33% reduction in gasoline sulfur was achieved.

Various papers, published by Andersson, P. et al., Catalysis Today 53:565 (1991), Beltran F. et al, *Applied Catalysis Environmental* 34:137 (2001) and 42: 145 (2003), relate in only a very general manner to the concept of the present invention.

SUMMARY OF THE INVENTION

The present invention comprises a composition for reducing the sulfur content of FCC gasoline, wherein the composition consists of a catalyst support and a Lewis acid component. Preferably, the support material is an amorphous or inorganic oxide such as, for example, $Al_2O_3$, clays or mixtures thereof. The sulfur reduction composition is used as a separate additive in combination with the conventional fluid catalytic cracking catalyst, which is normally a faujasite, such as zeolite Y, to crack hydrocarbon feeds in the FCC unit to produce low-sulfur gasoline and other liquid cracking products.

The composition of the present invention is a porous support material having (a) a first metal component from Group IVB of the Periodic Table within its pore structure and (b) a second metal component from Group IIB of the Periodic Table deposited on the surface of the support material.

The composition is most preferably made of a support comprising zirconium incorporated montmorillonite clay on which a Lewis acid component is impregnated.

It is an object of the present invention to provide a sulfur reducing composition and a method for the use of same which provides a gasoline with a significantly lower sulfur level, when compared to the sulfur reduction activity of a conventionally used FCC catalyst in the FCC process.

DETAILED DESCRIPTION OF THE INVENTION

Figure 1:
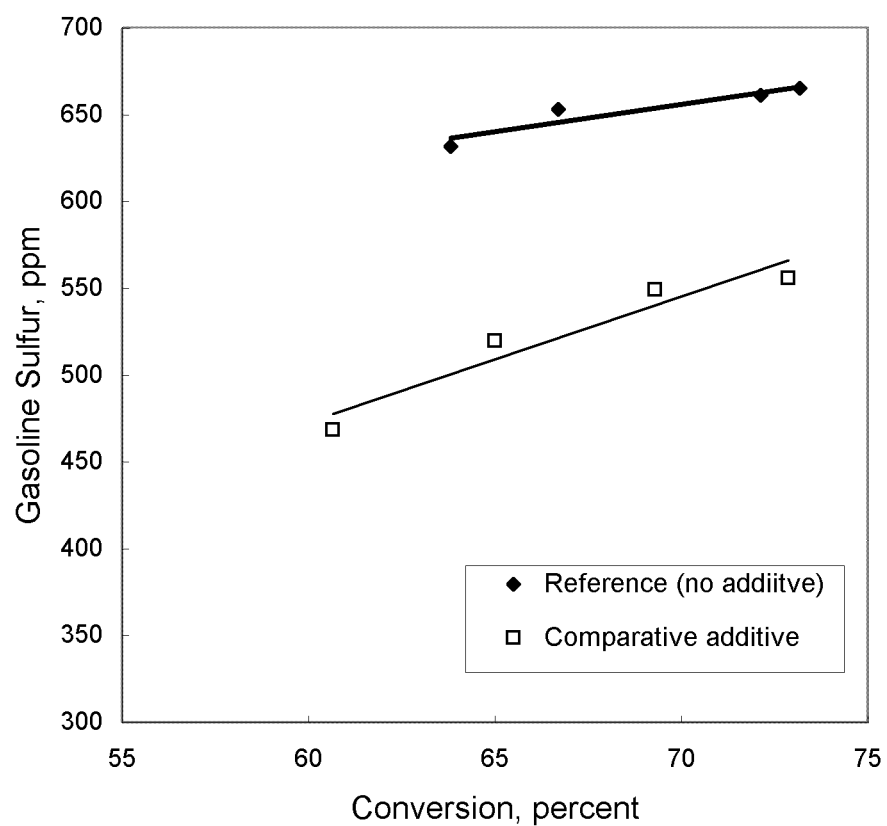
FIG. 1 is a plot of sulfur content of product gasoline fraction obtained with conventional FCC catalyst, without additive (reference) and FCC catalyst/commercial additive mixture (comparative) versus percent conversion.

In accordance with the present invention, the sulfur content of a FCC gasoline is reduced to lower levels by the use of an additive-containing catalyst composition. The FCC catalyst is preferably made of powder and generally possesses an average particle size in the range of 50-100 microns and a bulk density in the range of 0.5-1.0 kg/L. It is preferred that the particle size, density and mechanical strength of the catalyst composition of the present invention is the same as a conventional FCC catalyst in which the composition is to be physically mixed.

The cracking catalyst particles preferably contain at least one cracking catalyst component which is catalytically active for the cracking of hydrocarbons in the absence of added hydrogen. The cracking catalyst component preferably comprises a zeolite, a non-zeolite molecular sieve, a catalytically active amorphous silica alumina species, or a combination thereof. The cracking catalyst component is most preferably a Y-type zeolite selected from the group consisting of Y, USY, (described in U.S. Pat. No. 3,293,192, which is incorporated herein by reference), REY and RE-USY (described in U.S. Pat. Nos. 3,607,368 and 3,676,368, both of which are incorporated herein by reference) and mixtures thereof. The cracking catalyst particles may also contain one or more matrix components such as clays, modified clays, alumina, etc. The cracking catalyst particles may also contain a binder such as an inorganic oxide sol or gel. Preferably, the cracking catalyst particles contain at least 5 wt. %, more preferably about 5 to 50 wt. %, of cracking catalyst component.

The support material of the claimed composition is preferably a montmorillonite clay which possesses a surface area in the range of 150-350 m²/g. The clay has been calcined in air at 550° C. to remove physically adsorbed water. Calcinations at 550° C. did not result in much increase in the surface area.

Clay material itself possesses considerable capacity to reduce sulfur in gasoline fraction. However, the reduction in the benzothiophene fraction is minimal. It was observed that the impregnation of a Lewis acid component onto the clay did not significantly increase either overall sulfur reduction capacity or the reduction of benzotiophene.

Incorporating zirconium, the preferred Group IVB metal, into the pores of the subject clay increased the surface area by about 15 to about 25%. It was observed that impregnation of the zirconium incorporated clay material with a Lewis acid significantly reduced the sulfur content of the gasoline fraction which is catalytically cracked. It is most preferable to use a Lewis acid including compounds of Group IIB metals, preferably zinc, to effect a reduction in the sulfur content of gasoline.

In order to further illustrate the present invention and the advantages thereof, the following specific examples are presented. The examples are presented as specific description of the claimed invention. It should be understood, however, that the invention is not limited to the specific details set forth in the examples. The examples illustrate the preparation and catalytic evaluation of specific compositions for reducing sulfur content of a catalytically cracked gasoline fraction.

EXAMPLES

Micro activity test (MAT) evaluation of FCC catalyst/additive mixtures were carried out according to ASTM method D-3907, at a reaction temperature of 510° C. and a injection time of 30 seconds for a catalyst to oil ratio between 3 to 5, to obtain conversion of 55 to 75%. The feed used was a vacuum gas oil of Arabian light crude origin. Sulfur content of this feed was 2.5 weight percent. Other properties of this feed are shown in Table 1. The sulfur content of the gasoline fraction was measured by GC-SCD. For comparison purposes, sulfur content of gasoline fraction was calculated at 71% conversion level.

Example 1

Sulfur content of gasoline fraction obtained with use of a conventional FCC catalyst A steamed, conventional, commercial FCC zeolite catalyst, a typical low RE-USY type available from any FCC catalyst supplier, was evaluated in MAT according to ASTM D 3907. FIG. 1 shows the plot of gasoline sulfur content versus percent conversion obtained with only the conventional catalyst without any additive (reference). This sulfur content is taken as a reference.

Example 2

Sulfur reduction with a commercially available additive composition

A commercial sulfur reduction additive generally available from a typical catalyst supplier, for example, Albemarle, CCIC, Englehard, Grace Davison, or Intercat, labeled as comparative additive in the tables were added (10 wt. %) to the same steamed conventional FCC catalyst, namely, low RE-USY, as in Example 1 and was tested in MAT under the same conditions as in Example 1. The sulfur content of the gasoline fraction in this Example is compared with the reference sulfur content in FIG. 1. At a conversion of 71%, the overall sulfur reduction achieved including benzothiophene, was 16%. Table 2 lists the sulfur content of gasoline fraction for all the additives.

Example 3

Figure 2:
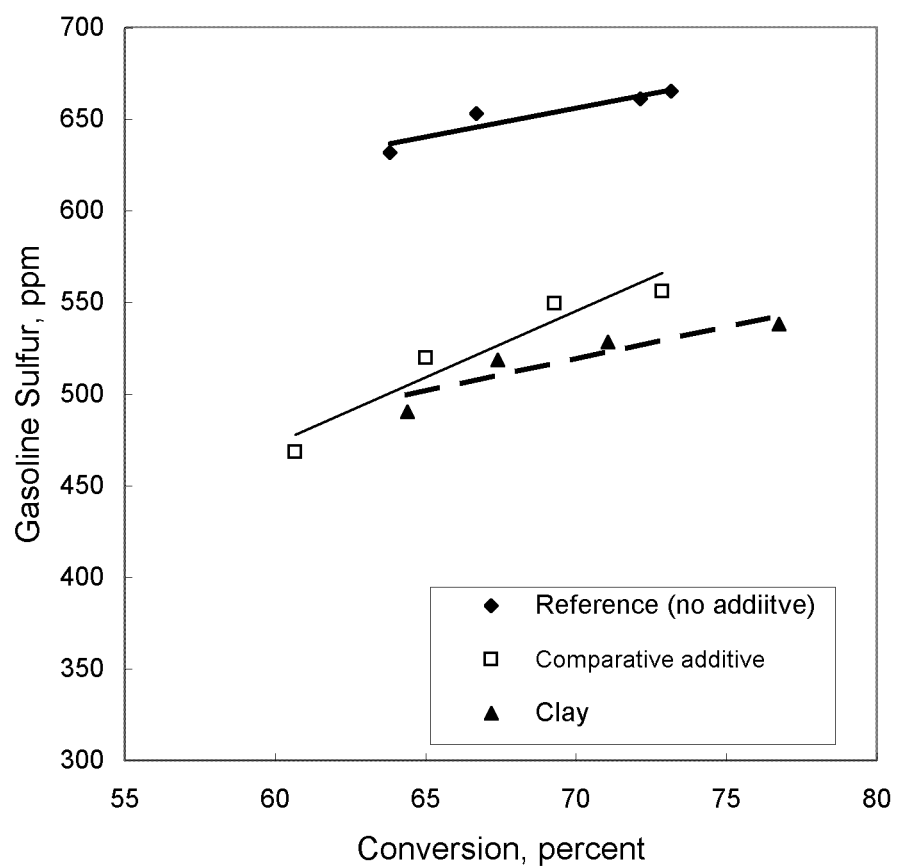
FIG. 2 is a plot of sulfur content of product gasoline fraction obtained with reference (no additive), the comparative additive, and the novel composition's base material (clay) versus percent conversion.

Base material of the claimed novel composition has considerable capacity to reduce sulfur content of FCC naphtha To measure the sulfur reduction ability of the support material, Montmorillonite clay itself was mixed with a conventional catalyst, a typical RE-USY type available from any FCC catalyst supplier, and evaluated in MAT. The results obtained, which are shown in FIG. 2, were compared with the reference. Montmorillonite clay has considerable sulfur reduction ability. Sulfur content of the product gasoline fraction was reduced by 21% (Table 2).

Example 4

Results obtained by use of a zinc-impregnated clay

Figure 3:
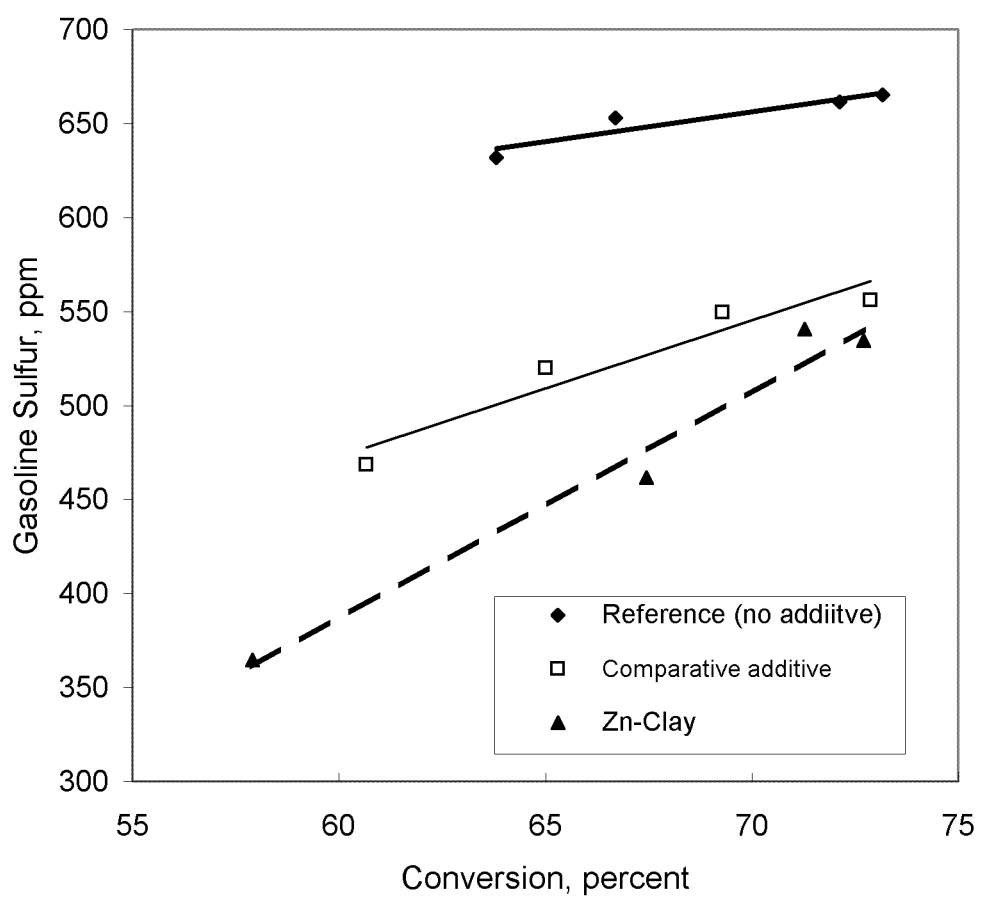
FIG. 3 is a plot of sulfur content of product gasoline fraction obtained with zinc impregnated-base material, reference material and the comparative additive versus percent conversion.

A composition was prepared by impregnating 2% Zn on the clay described in Example 3 by the incipient wetness method. 10%, by weight, of this composition was mixed with the same commercial catalyst, a typical low RE-USY type, available from any FCC catalyst supplier, as in Example 1 and tested in MAT. FIG. 3 compares the sulfur content of gasoline obtained by the composition of Example 4 with that obtained by use of the reference catalyst and the composition of Example 3. It is seen that sulfur reduction ability of this composition is similar to the composition of Example 3. At 71% conversion, product gasoline sulfur was reduced by 21% compared with the reference catalyst.

Example 5

Effect of incorporating zirconium into the pores of clay

A composition of Zr-Clay was prepared by incorporating zirconium into the pores of montmorillonite clay by ion exchange. About 2 weight percent zirconium was incorporated. This composition was mixed with a commercial FCC zeolite catalyst, a typical low RE-USY type, available from any FCC catalyst supplier, in a ratio of 1:10.

Figure 4:
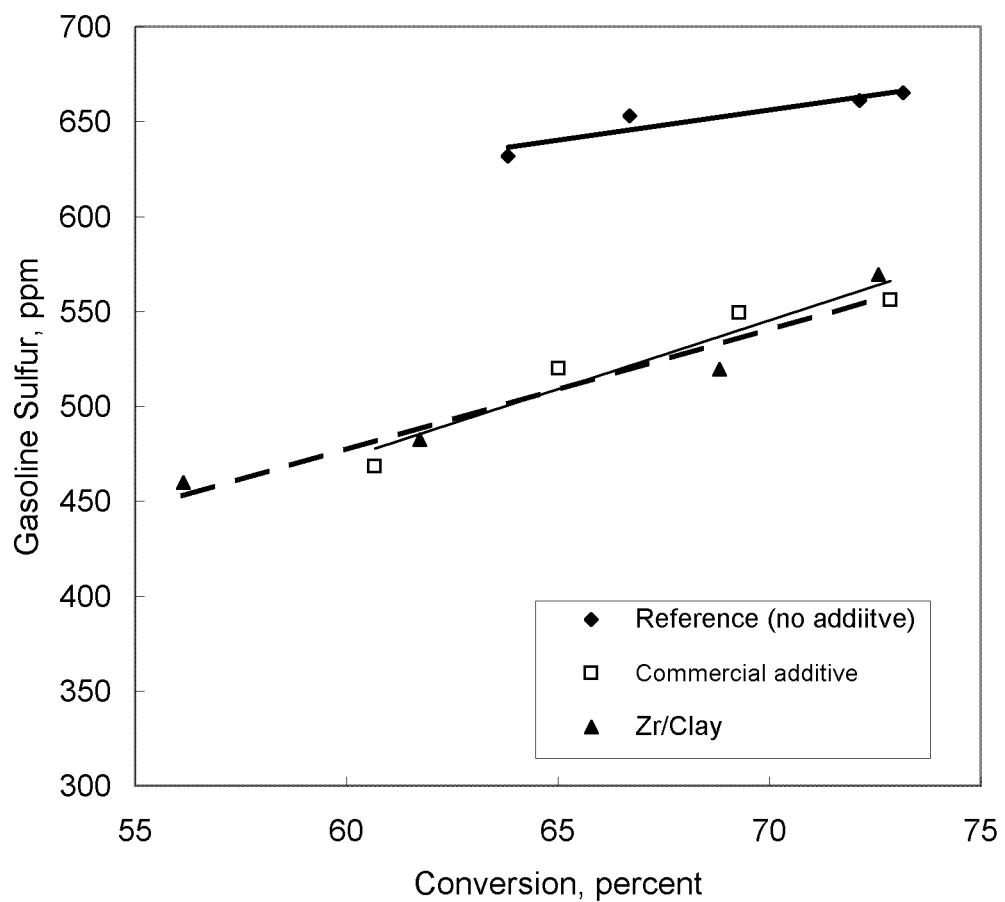
FIG. 4 is a plot of sulfur content of product gasoline fraction obtained with zirconium incorporated-base material, reference material and the comparative additive versus percent conversion.

FIG. 4 shows the sulfur content of gasoline fraction versus conversion for the reference catalyst and the Zr-clay/catalyst mixture. The MAT test conducted with the composition of Zr/clay added to the commercial FCC catalyst gave a 17% reduction (at 71% conversion) in the sulfur content of cracked gasoline fraction, which was comparable to that obtained with the comparative additive of Example 2.

Example 6

Results employing zinc impregnated on zirconium incorporated montmorillonite clay A composition was prepared by impregnating 2 wt. % zinc on the composition described in Example 5 (Zr incorporated clay), by the incipient wetness method. 10 wt. % of this material was mixed with a typical low RE-USY type, available from any FCC catalyst supplier, and tested in MAT at the same conditions as described in Example 1.

Figure 5:
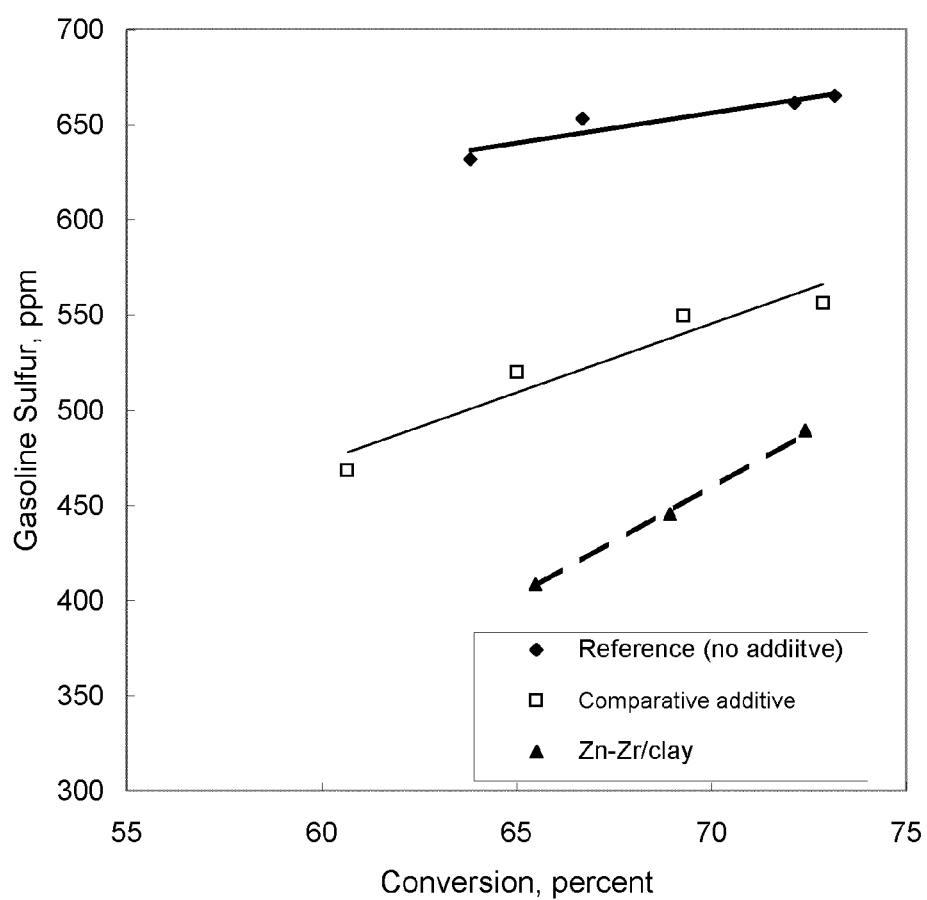
FIG. 5 is a plot of sulfur content of product gasoline fraction obtained with the novel composition, reference material and the comparative versus percent conversion.

FIG. 5 shows the gasoline sulfur content obtained with this material compared with that obtained with the compositions of Example 1 and Example 2. With the composition of this Example (Zn impregnated on Zr-incorporated clay), the sulfur content of the gasoline was reduced by 28% (Table 2). It can be seen that the additive composition of the present invention is superior to the comparative additive of the prior art.

Example 7

Composition consisting of zinc impregnated on zirconium incorporated montmorillonite clay (sulfur compound distribution)

Catalytically cracked gasoline contains different sulfur compounds, such as mercaptans, saturates, thiophenes and benzothiophenes. Sulfur compound distribution in the product gasoline fraction obtained in Example 6 was determined by the use of GC-SCD. It is shown in Table 3. The composition of the present invention possesses a different reducing effect with respect to the various types of sulfur compounds. With the composition of the present invention, sulfur reduction is most effective for saturates and $C_2$-$C_4$ thiophenes.

Example 8

Gasoline yield is not affected by the use of novel additive

Table 4 lists the product yields of gasoline, gas, LCO, HCO and coke obtained with a conventional catalyst, i.e., low RE-USY®, a comparative additive, and the additive compositions of the present invention, at 71% conversion. Gasoline yield and coke yield is not affected by the use of the additive composition of the present invention, which is 50% and 3.1%, respectively.

TABLE 1

Properties of vacuum gas oil (VGO).

| Property | Unit | Value |
| --- | --- | --- |
| Density | g/cc | 0.882 |
| API |  | 29.1 |
| Carbon | wt % | 85.08 |
| Hydrogen | wt % | 12.08 |
| Sulfur | wt % | 2.46 |
| Nitrogen | ppm | 960 |
| Initial Boiling Point (IBP) | ° C. | 214 |
| Final Boiling Point (FBP) | ° C. | 588 |

TABLE 2

Sulfur content of gasoline fraction and percent reduction in sulfur content obtained with reference (no additive), comparative additive and other four additive compositions

| Additive | Gasoline Sulfur, ppm | Percent reduction |
| --- | --- | --- |
| Reference (no additive) | 659 | 0 |
| Comparative | 553 | 16 |
| Clay | 523 | 21 |
| Zn/Clay | 520 | 21 |
| Zr/Clay | 547 | 17 |
| Zn—Zr/Clay | 472 | 28 |

TABLE 3

Sulfur compounds distribution, total gasoline sulfur and percent reduction obtained with reference (Example 1), comparative additive (Example 2) and the composition of the present invention (Example 3), at a conversion level of 71%.

| Sulfur compound | Reference ppm | Comparative additive ppm | Comparative additive % reduction | Zn—Zr/Clay ppm | Zn—Zr/Clay % reduction |
| --- | --- | --- | --- | --- | --- |
| Saturates | 40 | 38 | 5 | 16 | 60 |
| Thiophene-C1-thiophene | 60 | 64 | −6 | 33 | 45 |
| C2-C4 Thiophenes | 252 | 185 | 26 | 108 | 57 |
| Benzothiophene | 307 | 266 | 13 | 314 | −2.5 |
| Total Sulfur in gasoline | 659 | 553 | 16 | 472 | 28 |

TABLE 4

MAT yields obtained with reference (no additive), comparative additive and other four additive compositions

| | Additive | | | | | |
|---|---|---|---|---|---|---|
| | Ref: no additive | Comparative | Clay | Zn/ Clay | Zr/ Clay | Zn—Zr/ Clay |
| Gasoline (wt. %) | 50 | 52 | 51 | 51 | 52 | 50 |
| Gas | 17 | 15 | 16 | 17 | 15 | 18 |
| LCO | 17 | 17 | 17 | 17 | 18 | 16 |
| HCO | 12 | 12 | 12 | 12 | 11 | 13 |
| Coke | 3.4 | 3.4 | 3.6 | 3.9 | 3.3 | 3.1 |

Various modifications of the present invention are possible in light of the foregoing teachings. However, it is to be understood that other modifications may be made without departing from the scope thereof, which is to be determined solely by the claims which follow.

What is claimed is:

1. A fluid catalytic cracking (FCC) mixture consisting of (i) an FCC catalyst and (ii) separate particles of sulfur reduction additive, said particles of sulfur reduction additive consisting of:
   a clay support consisting of porous montmorillonite clay; a zirconium component; and zinc, wherein the zirconium component is incorporated into the pore structure of the porous montmorillonite clay support to thereby increase surface area of said clay support and the zinc is impregnated on the surface of the porous montmorillonite clay support.

2. The mixture according to claim 1, wherein the sulfur reduction additive contains from about 1 to about 5 weight percent of zirconium based on the total weight of the additive.

3. The mixture according to claim 1, wherein the sulfur reduction additive contains from about 1 to about 10 weight percent of zinc based on the total weight of the additive.

4. The mixture according to claim 1, wherein the concentration of the sulfur reduction additive is from about 10 to about 20 weight percent of the cracking catalyst.

* * * * *